(12) United States Patent
Yang

(10) Patent No.: US 11,178,526 B2
(45) Date of Patent: Nov. 16, 2021

(54) SERVICE TRANSMISSION METHOD, TERMINAL DEVICE, AND NETWORK DEVICE

(71) Applicant: GUANGDONG OPPO MOBILE TELECOMMUNICATIONS CORP., LTD., Guangdong (CN)

(72) Inventor: Ning Yang, Guangdong (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 43 days.

(21) Appl. No.: 16/628,629

(22) PCT Filed: Aug. 18, 2017

(86) PCT No.: PCT/CN2017/098126
§ 371 (c)(1),
(2) Date: Jan. 3, 2020

(87) PCT Pub. No.: WO2019/033416
PCT Pub. Date: Feb. 21, 2019

(65) Prior Publication Data
US 2021/0144529 A1 May 13, 2021

(51) Int. Cl.
*H04W 4/50* (2018.01)
*H04W 4/46* (2018.01)
(Continued)

(52) U.S. Cl.
CPC .............. *H04W 4/50* (2018.02); *H04W 4/20* (2013.01); *H04W 4/46* (2018.02); *H04W 72/048* (2013.01); *H04W 72/10* (2013.01)

(58) Field of Classification Search
CPC ......... H04W 4/50; H04W 4/20; H04W 72/10; H04W 4/46; H04W 72/048; H04W 72/0453
See application file for complete search history.

(56) References Cited

U.S. PATENT DOCUMENTS 5,469,431 A * 11/1995 Wendorf ............... H04H 60/25
348/E7.017
6,215,530 B1 * 4/2001 Wasilewski ........ H04N 21/2362
348/731
(Continued)

FOREIGN PATENT DOCUMENTS

CN 101860475 A 10/2010
CN 102547610 A 7/2012
(Continued)

OTHER PUBLICATIONS

European search report issued in corresponding European application No. 17921797.1 dated Apr. 21, 2020.
English Translation of First Chinese Office Action dated Jun. 2, 2020 from Application No. 201780091771.8.
(Continued)

*Primary Examiner* — Un C Cho
*Assistant Examiner* — Lalita W Pace
(74) *Attorney, Agent, or Firm* — Young Basile Hanlon & MacFarlane, P.C.

(57) ABSTRACT

The application provides a wireless communication method, a terminal device, and a network device. The method includes: a terminal device determining, according to a service identifier of a service to be transmitted, a carrier or a carrier set for sending or receiving the service to be transmitted; and the terminal device sending or receiving the service to be transmitted on a carrier or a carrier set corresponding to the service identifier, wherein the service identifier is a service code point or a service primitive of the service to be transmitted generated at the service layer, the service code point is a code of a service generated by the service to be transmitted on the service layer, and the service primitive is a textual description of the service generated by the service to be transmitted on the service layer.

15 Claims, 8 Drawing Sheets

(51) Int. Cl.
*H04W 4/20* (2018.01)
*H04W 72/04* (2009.01)
*H04W 72/10* (2009.01)

(56) References Cited

U.S. PATENT DOCUMENTS

| | | | |
|---|---|---|---|
| 9,781,744 | B1* | 10/2017 | Tenny ................... H04L 5/0032 |
| 2006/0030342 | A1* | 2/2006 | Hwang ............ H04N 21/41407 |
| | | | 455/466 |
| 2010/0083311 | A1* | 4/2010 | Vare ..................... H04N 21/482 |
| | | | 725/39 |
| 2013/0044670 | A1 | 2/2013 | Jang et al. |
| 2016/0269875 | A1* | 9/2016 | Lee ......................... H04W 4/06 |
| 2018/0287767 | A1* | 10/2018 | Paredes Cabrera ... H04W 72/10 |
| 2018/0324560 | A1* | 11/2018 | Xu ........................... H04W 4/40 |
| 2019/0053215 | A1* | 2/2019 | Yu ...................... H04W 28/0268 |
| 2019/0174280 | A1* | 6/2019 | Xu ........................... H04L 67/12 |
| 2019/0215806 | A1* | 7/2019 | Chai ................. H04W 72/0406 |
| 2019/0349936 | A1* | 11/2019 | Li ........................... H04W 88/02 |
| 2019/0357025 | A1* | 11/2019 | Hwang ................... H04L 5/001 |
| 2019/0357235 | A1* | 11/2019 | Wang ............... H04W 72/1268 |

FOREIGN PATENT DOCUMENTS

| | | |
|---|---|---|
| CN | 103678688 A | 3/2014 |
| CN | 106488384 A | 3/2017 |
| CN | 106658352 A | 5/2017 |
| EP | 3373612 A1 | 9/2018 |
| WO | 2016210048 A1 | 12/2016 |
| WO | 2017051330 | 3/2017 |
| WO | 2017051494 A1 | 3/2017 |
| WO | 2017076037 A1 | 5/2017 |

OTHER PUBLICATIONS

3GPP TSG-CT WG1 Meeting #105; Krakow (Poland), Aug. 21-26, 2017; C1-173299.
3GPP TSG RAN WG2 Meeting #99; Berlin, Germany, Aug. 21-25, 2017; R2-1708682.
3GPP TSG-RAN WG2#99; Berlin, Germany, Aug. 22-26, 2017; R2-1708039.
3GPP TS 23.285; 3rd Generation Partnership Project; 35 pages; XPO51298387A.
China Second Office Action with English Translation for CN Application 201780091771.8 dated Aug. 25, 2020.
China Decision on Refusal with English Translation for CN Application 201780091771.8 dated Nov. 18, 2020.

* cited by examiner

200

┌─────────────────────────────────────────────────┐
│ A terminal device determines a carrier or a carrier set for sending or
receiving a service to be transmitted according to a service
identification of the service to be transmitted │ ~210
└─────────────────────────────────────────────────┘
                        │
┌─────────────────────────────────────────────────┐
│ The terminal device sends or receives the service to be transmitted
on the carrier or the carrier set corresponding to the service
identification of the service to be transmitted │ ~220
└─────────────────────────────────────────────────┘

FIG. 3

SERVICE TRANSMISSION METHOD, TERMINAL DEVICE, AND NETWORK DEVICE

CROSS-REFERENCE TO RELATED APPLICATION(S)

This application is a 371 application of International Application No. PCT/CN2017/098126, filed on Aug. 18, 2017, the entire disclosure of which is hereby incorporated by reference.

TECHNICAL FIELD

The present disclosure relates to the field of communication, and more particularly to a wireless communication method, a terminal device, and a network device.

BACKGROUND

Everything (V2X) services can be divided into security related services and non-security related services according to security characteristics, meanwhile, in the Release-14 version of the 3GPP, it is proposed that specific V2X services can be mapped to specific frequencies for transmission. Specifically, a ProSe Per Packet Priority (PPPP) value is determined for each V2X packet on an upper layer, and an access layer (AS) may determine logical channel prioritization according to the PPPP. Each PPPP value corresponds to a Logical Channel Group (LCG), and transmission resources (e.g., resources on a carrier) of a group with a low priority can be used by a group with a high priority, but they cannot be used conversely.

However, the quantity of PPPP values allocated by the upper layer is limited, and then Quality of Service (QoS) requirements in terms of delay and reliability, etc. of different V2X services are difficult to be accurately reflected. Secondly, in the PPPP-based solution, there may be a case where multiple V2X services have the same PPPP values, under which it is difficult to allocate resources on different carriers for different services by using the PPPP values.

SUMMARY

Implementations of the present disclosure provides a wireless communication method, a terminal device and a network device.

In a first aspect, an implementation of the present disclosure provides a wireless communication method. The method includes: determining, by a terminal device, a carrier or a carrier set for sending or receiving a service to be transmitted according to a service identification of the service to be transmitted; and sending or receiving, by the terminal device, the service to be transmitted on the carrier or the carrier set corresponding to the service identification of the service to be transmitted, wherein the service identification of the service to be transmitted is a service code point or a service primitive of the service to be transmitted that is generated on a service layer, the service code point is a code of the service generated by the service to be transmitted on the service layer, and the service primitive is a text description of the service generated by the service to be transmitted on the service layer.

Optionally, in an implementation of the first aspect, determining, by the terminal device, the carrier or the carrier set for transmitting or receiving the service to be transmitted according to the service identification of the service to be transmitted, includes: classifying, by the terminal device, the service to be transmitted on the service layer, and assigning different service identifications to different types of services; and determining, by the terminal device, the carrier or the carrier set for sending or receiving the service to be transmitted according to the service identification of the service to be transmitted.

Optionally, in an implementation of the first aspect, determining, by the terminal device, the carrier or the carrier set for sending or receiving the service to be transmitted according to the service identification of the service to be transmitted, includes: determining, by the terminal device, the carrier or the carrier set for sending or receiving the service to be transmitted according to the service identification of the service to be transmitted and a corresponding relationship between the service identification of the service to be transmitted and the carrier or the carrier set.

Optionally, in an implementation of the first aspect, before the terminal device determines the carrier or carrier set for sending or receiving the service to be transmitted according to the service identification of the service to be transmitted and the corresponding relationship between the service identification of the service to be transmitted and the carrier or carrier set, the method further includes: receiving, by the terminal device, first information sent by a network device, wherein the first information includes the corresponding relationship between the service identification of the service to be transmitted and the carrier or the carrier set.

Optionally, in an implementation of the first aspect, before the terminal device determines the carrier or carrier set for sending or receiving the service to be transmitted according to the service identification of the service to be transmitted and the corresponding relationship between the service identification of the service to be transmitted and the carrier or carrier set, the method further includes: classifying, by the terminal device, the service to be transmitted on the service layer, assigning different service identifications to different types of services, wherein the service identification is a service code point or a service primitive; and establishing, by the terminal device, the corresponding relationship between the service identification of the service to be transmitted and the carrier or the carrier set.

Optionally, in an implementation of the first aspect, classifying, by the terminal device, the service to be transmitted on the service layer, includes: dividing, by the terminal device, the service to be transmitted into a plurality of service types on a service layer, wherein a quantity of the plurality of service types is larger than a quantity of ProSe Per Packet Priority (PPPP) values.

Optionally, in an implementation of the first aspect, the corresponding relationship between the service identification of the service to be transmitted and the carrier or carrier set is preconfigured.

Optionally, in an implementation of the first aspect, determining, by the terminal device, the carrier or the carrier set for sending or receiving the service to be transmitted according to the service identification of the service to be transmitted and the corresponding relationship between the service identification of the service to be transmitted and the carrier or the carrier set, includes: receiving, by the terminal device, second information sent by the network device, wherein the second information indicates that a first carrier set is a carrier set for the terminal device to transmit a service; and determining, by the terminal device, the carrier or carrier set for sending or receiving the service to be transmitted according to the first carrier set, the service identification of the service to be transmitted and the corresponding relationship between the service identification of the service to be transmitted and the carrier or the carrier set.

Optionally, in an implementation of the first aspect, the second information is system information or radio resource control (RRC) information.

Optionally, in an implementation of the first aspect, determining, by the terminal device the carrier or carrier set for sending or receiving the service to be transmitted according to the service identification of the service to be transmitted and the corresponding relationship between the service identification of the service to be transmitted and the carrier or carrier set, includes: determining, by the terminal device, the carrier or carrier set for sending or receiving the service to be transmitted according to a second carrier set, the service identification of the service to be transmitted and the corresponding relationship between the service identification of the service to be transmitted and the carrier or the carrier set, wherein the second carrier set is a preconfigured carrier set for the terminal device to transmit a service.

Optionally, in an implementation of the first aspect, sending or receiving, by the terminal device, the service to be transmitted on the carrier or carrier set corresponding to the service identification of the service to be transmitted, includes: when performing logical channel prioritization (LCP) on the service to be transmitted on a media access control (MAC) layer, transmitting, by the terminal device, the service to be transmitted on a transmission block of the carrier or the carrier set corresponding to the service identification of the service to be transmitted according to the corresponding relationship between the service identification of the service to be transmitted and the carrier or the carrier set.

Optionally, in an implementation of the first aspect, the corresponding relationship between the service identification of the service to be transmitted and the carrier or the carrier set includes: a corresponding relationship between the service identification of the service to be transmitted and a data radio bearer (DRB), a corresponding relationship between the DRB and a logical channel, and a corresponding relationship between the logical channel and the carrier or the carrier set.

Optionally, in an implementation of the first aspect, the corresponding relationship between the service identification of the service to be transmitted and the carrier or the carrier set includes: a corresponding relationship between the service identification of the service to be transmitted and a logical channel, and a corresponding relationship between the logical channel and the carrier or the carrier set.

Optionally, in an implementation of the first aspect, the corresponding relationship between the service identification of the service to be transmitted and the carrier or the carrier set is integrated in a mapping table.

Optionally, in an implementation of the first aspect, the mapping table further includes: information of duplicating or shunting a service to which the service identification of the service to be transmitted belongs.

Optionally, in an implementation of the first aspect, the service to be transmitted is a vehicle to everything (V2X) service.

In a second aspect, an implementation of the present disclosure provides a wireless communication method. The method includes: establishing, by a network device, a corresponding relationship between a service identification of a service to be transmitted and a carrier or a carrier set; and sending, by the network device, first information to a terminal device, wherein the first information includes the corresponding relationship between the service identification of the service to be transmitted and the carrier or the carrier set; wherein the service identification of the service to be transmitted is a service code point or a service primitive of the service to be transmitted that is generated on a service layer, the service code point is a code of the service generated by the service to be transmitted on the service layer, and the service primitive is a text description of the service generated by the service to be transmitted on the service layer.

Optionally, in an implementation of the second aspect, the method further includes: sending, by the network device, second information to the terminal device, wherein the second information indicates that a first carrier set is a carrier set for the terminal device to transmit a service.

Optionally, in an implementation of the second aspect, the second information is system information or radio resource control (RRC) information.

Optionally, in an implementation of the second aspect, establishing, by the network device, the corresponding relationship between the service identification of the service to be transmitted and the carrier or the carrier set, includes: classifying, by the network device, the service to be transmitted on the service layer, and assigning different service identifications to different types of services, wherein the service identification is a service code point or a service primitive; and establishing, by the network device, the corresponding relationship between the service identification of the service to be transmitted and the carrier or the carrier set.

Optionally, in an implementation of the second aspect, classifying, by the network device, the service to be transmitted on the service layer, includes: dividing, by the network device, the service to be transmitted into a plurality of service types on the service layer, wherein a quantity of the plurality of service types is larger than a quantity of ProSe Per Packet Priority (PPPP) values.

Optionally, in an implementation of the second aspect, the corresponding relationship between the service identification of the service to be transmitted and the carrier or the carrier set includes: a corresponding relationship between the service identification of the service to be transmitted and a data radio bearer (DRB), a corresponding relationship between the DRB and a logical channel, and a corresponding relationship between the logical channel and the carrier or the carrier set.

Optionally, in an implementation of the second aspect, the corresponding relationship between the service identification of the service to be transmitted and the carrier or the carrier set includes: a corresponding relationship between the service identification of the service to be transmitted and a logical channel, and a corresponding relationship between the logical channel and the carrier or the carrier set.

Optionally, in an implementation of the second aspect, the corresponding relationship between the service identification of the service to be transmitted and the carrier or the carrier set is integrated in a mapping table.

Optionally, in an implementation of the second aspect, the mapping table further includes: information of duplicating or shunting a service to which the service identification of the service to be transmitted belongs.

Optionally, in an implementation of the second aspect, the service to be transmitted is a vehicle to everything (V2X) service.

In a third aspect, an implementation of the present disclosure provides a terminal device that may perform a module or unit of the method in the first aspect or any optional implementation of the first aspect.

In a fourth aspect, an implementation of the present disclosure provides a network device that may perform a module or unit of the method in the second aspect or any optional implementation of the second aspect.

In a fifth aspect, a terminal device is provided, which includes a processor, a memory, and a communication interface. The processor is connected with the memory and the communication interface. The memory is configured to store instructions, and the processor is configured to execute the instructions, and the communication interface is configured to communicate with other network elements under the control of the processor. When the processor executes the instructions stored in the memory, the execution causes the processor to execute the method in the first aspect or any possible implementation of the first aspect.

In a sixth aspect, a network device is provided, which includes a processor, a memory, and a communication interface. The processor is connected with the memory and the communication interface. The memory is configured to store instructions, and the processor is configured to execute the instructions, and the communication interface is configured to communicate with other network elements under the control of the processor. When the processor executes the instructions stored in the memory, the execution causes the processor to execute the method in the second aspect or any possible implementation of the second aspect.

In a seventh aspect, a computer storage medium is provided, and the computer storage medium is configured to store program codes for instructing a computer to execute instructions of the method in the first aspect or any possible implementation of the first aspect.

In an eighth aspect, a computer storage medium is provided, and the computer storage medium is configured to store program codes for instructing a computer to execute instructions of the method in the second aspect or any possible implementation of the second aspect.

In a ninth aspect, a computer program product including instructions is provided, when executed on a computer, the instructions cause the computer to perform the methods described in the above various aspects.

BRIEF DESCRIPTION OF DRAWINGS

FIG. 3 is a schematic flowchart of a wireless communication method according to an implementation of the present disclosure.

DETAILED DESCRIPTION

Figure 1:
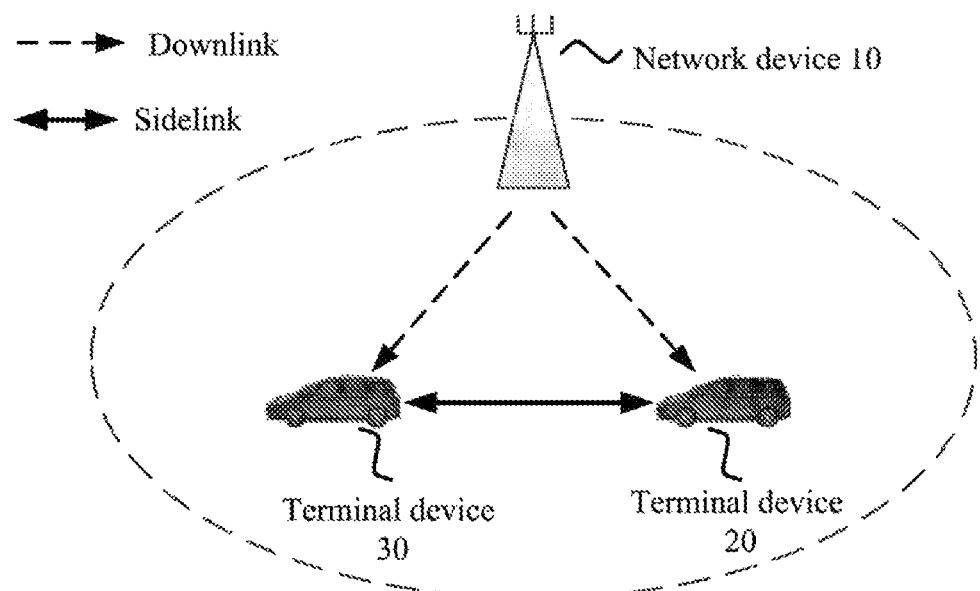
FIG. 1 is a schematic diagram of an application scenario according to an implementation of the present disclosure.

Technical solutions in implementations of the present disclosure will be clearly and completely described below with reference to the drawings in the implementations of the present disclosure.

The technical solutions of the implementations of the present disclosure may be applied to various communication systems, such as a Global System of Mobile communication (GSM) system, a Code Division Multiple Access (CDMA) system, a Wideband Code Division Multiple Access (WCDMA) system, a General Packet Radio Service (GPRS) system, a Long Term Evolution (LTE) system, a LTE Frequency Division Duplex (FDD) system, a LTE Time Division Duplex (TDD) system, a Universal Mobile Telecommunication System (UMTS) system, a Worldwide Interoperability for Microwave Access (WiMAX) communication system, or a future 5G system.

It should be understood that the technical solutions of the implementations of the present disclosure may be applied to a vehicle networking system, and the vehicle networking system may be based on the above-mentioned various communication systems, which can further realize Device to Device (D2D) communication between terminals, for example, a vehicle networking system based on LTE-D2D. Different from a traditional LTE system in which communication data between terminals are received or transmitted through a network device (e.g., a base station), a vehicle networking system adopts a Device-to-Device direct communication manner, thus having higher spectral efficiency and lower transmission delay.

D2D communication may refer to vehicle to vehicle (V2V) communication or vehicle to everything (V2X) communication. In the V2X communication, X may generally refer to any device with wireless receiving and sending capabilities, such as but not limited to a wireless device that moves slowly, a vehicle-mounted device that moves fast, or a network control node with wireless transmitting and receiving capabilities. It should be understood that the implementations of the present disclosure are mainly applied to V2X communication scenarios, but it may also be applied to any other D2D communication scenarios, and the implementations of the present disclosure are not limited thereto.

The terminal device in the implementations of the present disclosure may be a vehicle-mounted terminal device, or may be other devices which communicate with vehicle-mounted terminal device, for example, a terminal device in a future 5G network or a terminal device in a future evolved Public Land Mobile Network (PLMN), and the implementations of the present disclosure are not limited thereto.

Various implementations are described herein in connection with network devices in the present disclosure. The network device in the implementations of the present disclosure may be a device configured to communicate with the terminal device, the network device may be a Base Transceiver Station (BTS) in a GSM system or CDMA system, or may be a NodeB (NB) in a WCDMA system, or may be an evolved NodeB (eNB or eNodeB) in an LTE system, or may be a wireless controller in a scenario of a Cloud Radio Access Network (CRAN), or the network device may be a relay station, an access point, a vehicle-mounted device, a wearable device, a network device in a future 5G network, or a network device in a future evolved Public Land Mobile Network (PLMN), etc., which is not limited in the implementations of the present disclosure.

Figure 2:
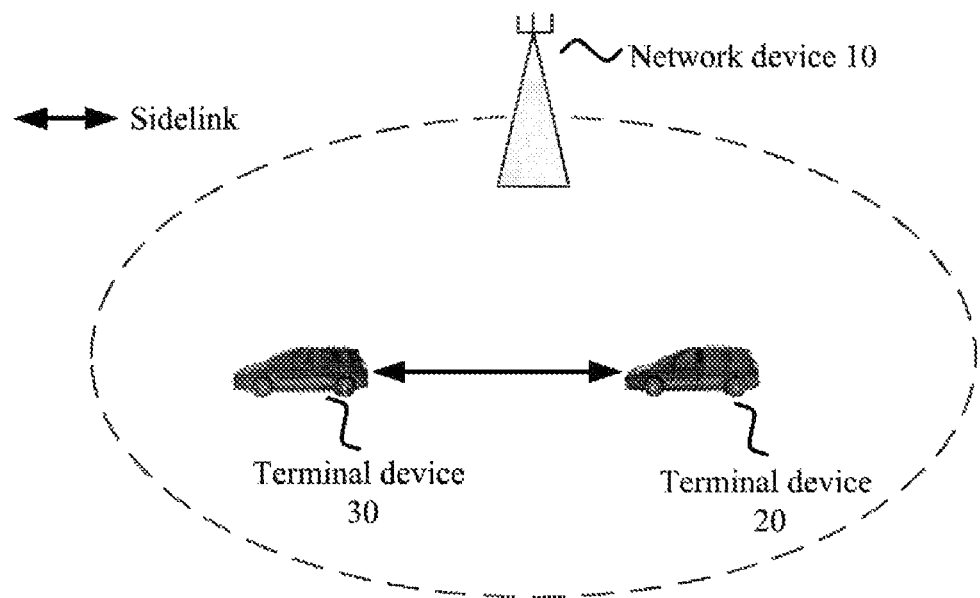
FIG. 2 is a schematic diagram of another application scenario according to an implementation of the present disclosure.

FIGS. 1 and 2 are schematic diagrams of an application scenario according to implementations of the present disclosure. FIG. 1 exemplary shows one network device and two terminal devices. Optionally, a wireless communication system in the implementations of the present disclosure may include a plurality of network devices and a coverage area of each network device may include other quantity of terminal devices, which is not limited in the implementations of the present disclosure. In addition, the wireless communication system may include other network entities, such as a Mobile Management Entity (MME), a Serving Gateway (S-GW), a Packet Data Network Gateway (P-GW), and the implementations of the present disclosure are not limited thereto.

Specifically, a terminal device 20 (e.g., a vehicle-mounted terminal) and a terminal device 30 (another terminal) may communicate through a D2D communication mode. During D2D communication, the terminal device 20 and the terminal device 30 directly communicate through a D2D link (i.e., a Sidelink (SL)). For example, as shown in FIG. 1 or FIG. 2, the terminal device 20 and the terminal device 30 communicate directly through the Sidelink. In FIG. 1, the terminal device 20 and the terminal device 30 communicate through the sidelink, and their transmission resources (e.g., carriers) are allocated by the network device. In FIG. 2, the terminal device 20 and the terminal device 30 communicate through the sidelink, and their transmission resources are independently selected by the terminal devices (e.g., the terminal device selects an available carrier in a resource pool), and the network device is not required to allocate the transmission resources.

In a vehicle networking system, there may be two types of terminal devices, which are, a terminal device with a listening capability such as a Vehicle User Equipment (VUE) or a Pedestrian User device (PUE), and a terminal device without a listening capability such as a PUE. A VUE has a higher processing capability and is usually powered by a battery in a car, while a PUE has a lower processing capability and reducing power consumption is a major factor to be considered for the PUE. Therefore, in existing vehicle networking systems, a VUE is considered to have full receiving capability and listening capability, while a PUE is considered to have partial or no receiving and listening capabilities. If a PUE has partial listening capability, a listening method similar to that of a VUE may be adopted for selection of resources of the PUE, and selection of available resources may be carried out on the part of resources that may be listened to; if the PUE does not have listening capability, the PUE randomly selects transmission resources in a resource pool.

Optionally, a V2X service may support following three scenarios.

(1) Different Media Access Control (MAC) Packet Data Units (PDUs) of a V2X service may be transmitted on different carriers to improve throughput.

(2) An MAC PDU of a V2X service may be duplicated and transmitted on different carriers to improve reliability.

(3) From the perspective of a receiving terminal device, a plurality of carriers need to be received, and a sending terminal device may perform sending on a part of the carriers, thus improving capacity.

Specifically, to support the scenario (1), a carrier set that may be used for shunt transmission for a specific service needs to be determined, to support the scenario (2), a carrier set that may be used for duplicate transmission for a specific service needs to be determined, and to support the scenario (3), a carrier or carrier set that may be used by the sending terminal device to transmit data needs to determined and a carrier set for receiving a specific V2X service needs to specified as well.

In the above three scenarios, to allocate corresponding carriers to different V2X services, the V2X services need to be mapped to the corresponding carriers to realize the transmission of V2X services on resources of specific carriers.

In addition, various aspects or features of the present disclosure may be implemented as methods, apparatuses, or articles of manufacture using standard programming and/or engineering techniques. The term "article of manufacture" used in the present disclosure encompasses a computer program accessible from any computer-readable device, carrier, or medium. For example, the computer-readable medium may include, but not limited to, a magnetic storage device (such as a hard disk, a floppy disk, or a magnetic tape), a disk (such as a compact disc (CD), a digital versatile disc (Digital Versatile Disc, DVD)), a smart card and a flash storage device (such as an Erasable Programmable Read-Only Storage (EPROM), card, stick or key drive). In addition, the various storage media described herein may represent one or more devices and/or other machine-readable medium for storing information. The term "machine-readable medium" may include, but is not limited to, various media capable of storing, containing, and/or carrying instructions and/or data.

It should be understood that the terms "system" and "network" are often used interchangeably in this document. The term "and/or" in this document is merely an association relationship describing associated objects, indicating that there may be three relationships, for example, A and/or B may indicate three cases: A alone, A and B, and B alone. In addition, the symbol "/" in this document generally indicates that objects before and after the symbol "/" have an "or" relationship.

FIG. 3 is a schematic flowchart of a wireless communication method 200 according to an implementation of the present disclosure. As shown in FIG. 3, the method 200 may be performed by a terminal device, and the terminal device may be the terminal device as shown in FIG. 1 or FIG. 2, and the network device in the method 200 may be the network device as shown in FIG. 1. The method 200 includes following contents.

In 210: A terminal device determines a carrier or a carrier set for sending or receiving a service to be transmitted according to a service identification of the service to be transmitted.

Optionally, the service to be transmitted is a V2X service.

Optionally, the V2X service includes service types such as a cooperative awareness message (CAM), a decentralized environmental notification message (DENM), etc.

Optionally, in Release-15 version of the 3GPP, V2X service types may include formation driving, remote driving, sensor data sharing, etc.

Optionally, the service identification of the service to be transmitted is a service code point or a service primitive of the service to be transmitted that is generated on a service layer, the service code point is a code of the service generated by the service to be transmitted on the service layer, and the service primitive is a text description of the service generated by the service to be transmitted on the service layer.

Optionally, the service code point of the service to be transmitted may select a quantity of bits according to a potential service type, and may support division of more service types.

For example, the service code points of the service to be transmitted may be V2X.1, V2X.2, V2X.3 . . . V2X.i . . . V2X.n.

Optionally, the service primitive of the service to be transmitted may be text and may carry more service type information.

For example, the service primitives of the service to be transmitted may be V2X.CAM 1, V2X.CAM 2 . . . V2X.CAM m, V2X.DENM 1, V2X.DENM 2 . . . V2X.DENM m, V2X.X 1 . . . V2X.X m . . . .

Optionally, the carrier or the carrier set for sending or receiving the service to be transmitted may be determined in following modes.

Mode 1: the terminal device classifies the service to be transmitted on the service layer and assigns different service identifications to different types of services; and the terminal device determines the carrier or the carrier set for sending or receiving the service to be transmitted according to the service identification of the service to be transmitted.

Optionally, when the terminal device classifies the service to be transmitted on the service layer, QoS requirement characteristics of the service to be transmitted in terms of time delay, reliability, etc., may be considered.

Mode 2: the terminal device determines the carrier or carrier set for sending or receiving the service to be transmitted according to the service identification of the service to be transmitted and a corresponding relationship between the service identification of the service to be transmitted and the carrier or the carrier set.

Optionally, the corresponding relationship between the service identification of the service to be transmitted and the carrier or the carrier set includes: a corresponding relationship between the service identification of the service to be transmitted and a Data Radio Bearer (DRB), a corresponding relationship between the DRB and a Logical Channel (LC), and a corresponding relationship between the logical channel and the carrier or the carrier set.

Figure 4:
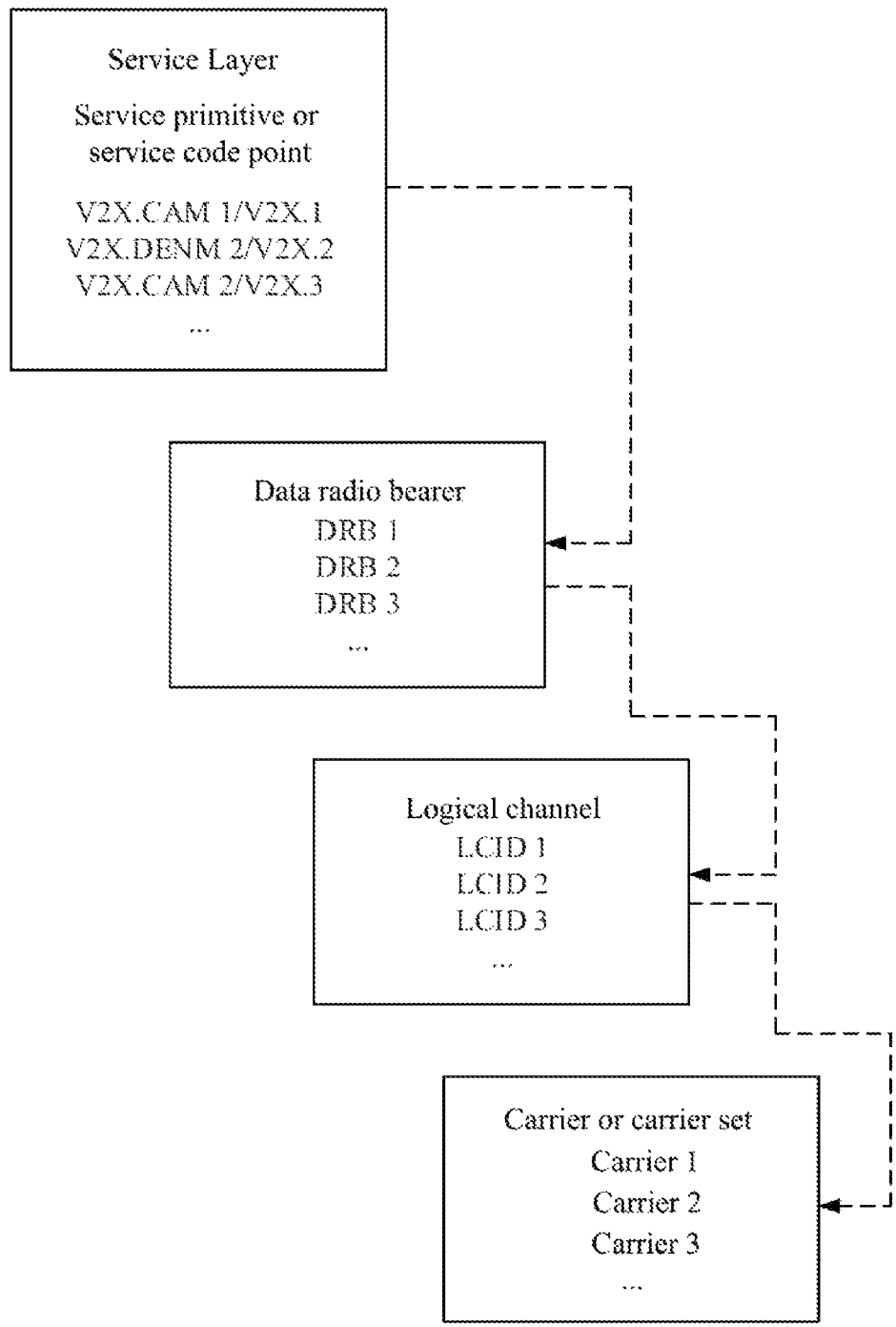
FIG. 4 is a schematic diagram of a corresponding relationship between a service identification of a service to be transmitted and a carrier or a carrier set according to an implementation of the present disclosure.

For example, as shown in FIG. 4, V2X.CAM 1/V2X.1 corresponds to DRB 1, V2X.DENM 2/V2X.2 corresponds to DRB 2, V2X.CAM 2/V2X.3 corresponds to DRB 3, the DRB 1 corresponds to a Logical Channel Identity (LCID) 1, the DRB 2 corresponds to an LCID 2, the DRB 3 corresponds to an LCID 3, the LCID 1 corresponds to a carrier a, the LCID 2 corresponds to a carrier b, and the LCID 3 corresponds to a carrier c, thus realizing the correspondence from the service identification of the service to be transmitted to the carrier or the carrier set.

Optionally, the corresponding relationship between the service identification of the service to be transmitted and the carrier or the carrier set includes: a corresponding relationship between the service identification of the service to be transmitted and a logical channel, and a corresponding relationship between the logical channel and the carrier or the carrier set.

Figure 5:
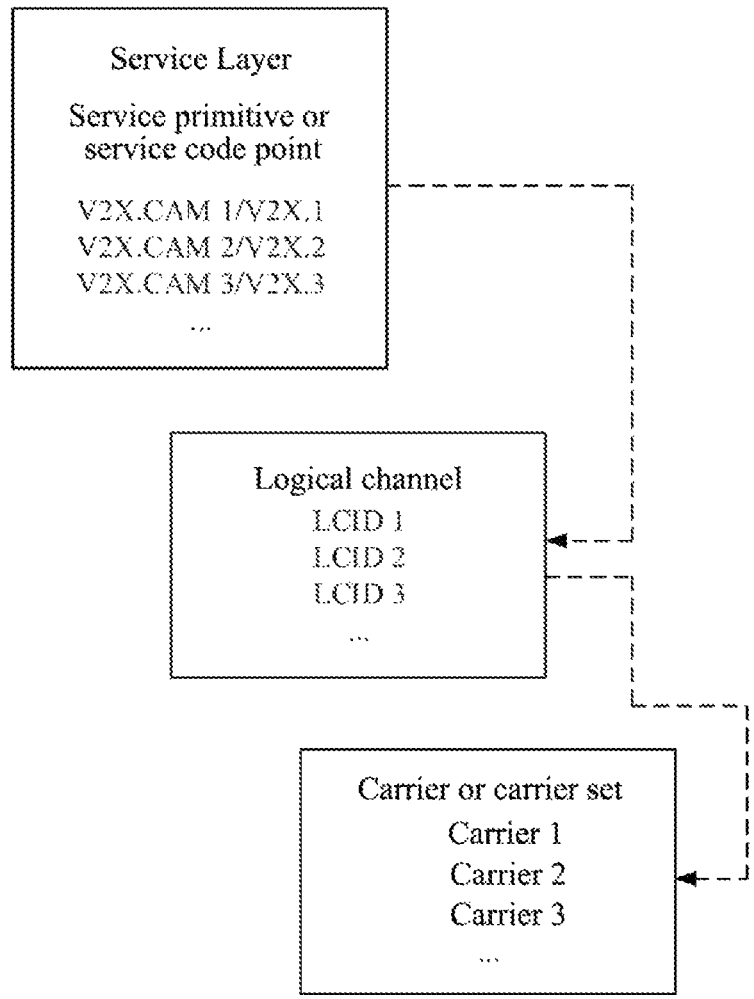
FIG. 5 is a schematic diagram of another corresponding relationship between a service identification of a service to be transmitted and a carrier or a carrier set according to an implementation of the present disclosure.

For example, as shown in FIG. 5, V2X.CAM 1/V2X.1 corresponds to an LCID 1, V2X.CAM 2/V2X.2 corresponds to an LCID 2, V2X.CAM 3/V2X.3 corresponds to an LCID 3, the LCID 1 corresponds to a carrier a, the LCID 2 corresponds to a carrier b, and the LCID 3 corresponds to a carrier c, thus realizing the correspondence from the service identification of the service to be transmitted to the carrier or the carrier set.

Optionally, the corresponding relationship between the service identification of the service to be transmitted and the carrier or the carrier set includes that the service identification of the service to be transmitted directly corresponds to the carrier or the carrier set.

Figure 6:
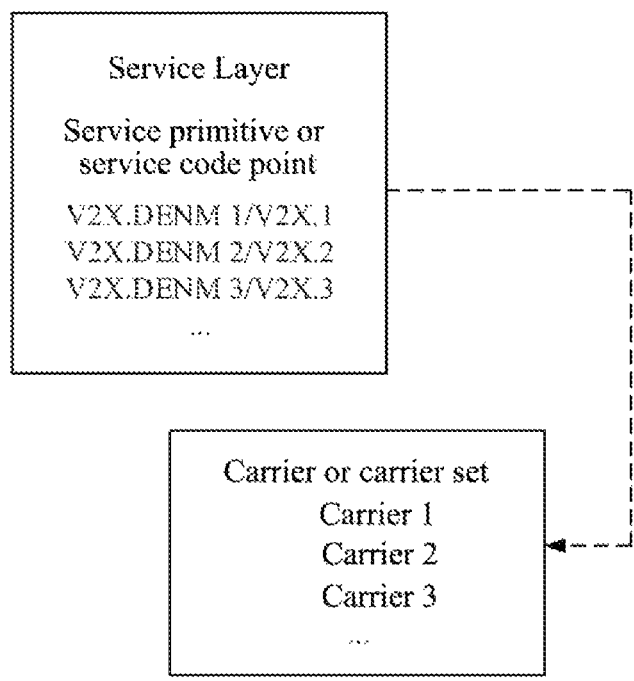
FIG. 6 is a schematic diagram of another corresponding relationship between a service identification of a service to be transmitted and a carrier or a carrier set according to an implementation of the present disclosure.

For example, as shown in FIG. 6, V2X.DENM 1/V2X.1 corresponds to a carrier a, V2X. DENM 2/V2X.2 corresponds to a carrier b, and V2X. DENM 3/V2X.3 corresponds to a carrier c.

Optionally, the corresponding relationship between the service identification of the service to be transmitted and the carrier or carrier set is integrated into a mapping table.

For example, as shown in Table 1, the corresponding relationship between the service identification of the service to be transmitted and the carrier or carrier set is determined according to the mapping table shown in Table 1.

TABLE 1

| Primitive of service layer | Data radio bearer identification | Mapping carrier (or Frequency point) | Other identification (reserved) |
| --- | --- | --- | --- |
| V2X.CAM 1 | 1 | a + b | |
| V2X.DENM 2 | 2 | c | |
| V2X.CAM 2 | 3 | b + c | |
| . . . | | | |

It should be understood that the table 1 is only described by taking a service primitive as an example, and it may be a service code point, which is not limited in the present disclosure.

It should be understood that the data radio bearer identification and the mapping carrier corresponding to the primitive of the service layer in Table 1 are only examples, and the present disclosure is not limited to those.

Optionally, the mapping table further includes: information of duplicating or shunting a service to which the service identification of the service to be transmitted belongs.

For example, the mapping table shown in Table 2 includes information of duplicating or shunting a service to which the service identification of the service to be transmitted belongs.

TABLE 2

| Primitive of service layer | Data radio bearer identification | Mapping carrier (or Frequency point) | Shunting or duplicating | Other identification |
| --- | --- | --- | --- | --- |
| V2X.CAM 1 | 1 | a + b | Shunting | |
| V2X.DENM 2 | 2 | c | Duplicating | |
| V2X.CAM 2 | 3 | b + c | Shunting | |
| . . . | | | | |

It should be understood that the table 2 is only described by taking a service primitive as an example, and it may be a service code point, which is not limited in the present disclosure.

It should be understood that the data radio bearer identification, the mapping carrier and corresponding shunting or duplicating information corresponding to the primitive of the service layer in Table 2 are only examples, and the present disclosure is not limited to those.

Optionally, the terminal device may acquire the corresponding relationship between the service identification of the service to be transmitted and the carrier or the carrier set from the network device.

For example, the terminal device receives first information sent by the network device, wherein the first information includes a corresponding relationship between the service identification of the service to be transmitted and the carrier or the carrier set.

Therefore, in the wireless communication method of the implementation of the present disclosure, the terminal device can receive the corresponding relationship between the service identification of the service to be transmitted and the carrier or the carrier set from the network device.

It should be understood that at this case, the terminal device, which may be a terminal device as shown in FIG. 1, receives grant information of the network device to perform resource transmission.

Optionally, the terminal device may establish the corresponding relationship between the service identification of the service to be transmitted and the carrier or carrier set.

For example, the terminal device classifies the service to be transmitted on the service layer and assigns different service identifications to different types of services, wherein the service identification is a service code point or a service primitive.

The terminal device establishes a corresponding relationship between the service identification of the service to be transmitted and the carrier or the carrier set.

Optionally, the terminal device divides the service to be transmitted into a plurality of service types on the service layer, and the quantity of the plurality of service types is larger than a quantity of ProSe Per Packet Priority (PPPP) values.

It should be understood that a maximum quantity of the PPPP values is 8.

Optionally, the corresponding relationship between the service identification of the service to be transmitted and the carrier or the carrier set may be preconfigured, for example, determined by a protocol.

Optionally, determining, by the terminal device, the carrier or the carrier set for sending or receiving the service to be transmitted according to the service identification of the service to be transmitted and the corresponding relationship between the service identification of the service to be transmitted and the carrier or the carrier set includes: the terminal device receives second information sent by the network device, wherein the second information indicates that a first carrier set is a carrier set for the terminal device to transmit a service; and the terminal device determines the carrier or carrier set for sending or receiving the service to be transmitted according to the first carrier set, the service identification of the service to be transmitted and the corresponding relationship between the service identification of the service to be transmitted and the carrier or carrier set.

Optionally, the second information may be grant information.

Optionally, the first carrier set is a carrier set configured by the network device for the terminal device to transmit a service.

Optionally, the second information is system information sent by the network device through broadcast, or radio resource control (RRC) information sent by the network device.

For example, the first carrier set includes a carrier a, a carrier b, a carrier c, and a carrier d. The carrier or the carrier set corresponding to the service identification of the service to be transmitted includes the carrier b, the carrier c, a carrier f, and a carrier h. At this case, the terminal device determines that the carrier for sending or receiving the service to be transmitted is the carrier b and the carrier c, or a carrier set b+c.

Optionally, determining, by the terminal device, the carrier or the carrier set for sending or receiving the service to be transmitted according to the service identification of the service to be transmitted and the corresponding relationship between the service identification of the service to be transmitted and the carrier or the carrier set includes: the terminal device determines the carrier or the carrier set for sending or receiving the service to be transmitted according to a second carrier set, the service identification of the service to be transmitted, and the corresponding relationship between the service identification of the service to be transmitted and the carrier or the carrier set, wherein the second carrier set is a preconfigured carrier set for the terminal device to transmit a service.

For example, the second carrier set is a carrier set determined by a protocol for transmitting a service.

For another example, the second carrier set includes a carrier e, a carrier f, a carrier g, and a carrier h. The carrier or the carrier set corresponding to the service identification of the service to be transmitted includes a carrier b, a carrier c, the carrier f and the carrier h. At this case, the terminal device determines that the carrier for sending or receiving the service to be transmitted is the carrier f and the carrier h, or a carrier set f+h.

Optionally, the terminal device determines the second carrier set according to a preconfigured carrier for transmitting resources. For example, the carriers that may be used by the terminal device for transmitting resources are a carrier a, a carrier b, a carrier c, a carrier d, a carrier e, a carrier f, a carrier g and a carrier h. The terminal device determines the second carrier set as a carrier set including the carrier a, the carrier b, and the carrier c.

Figures 7, 8:
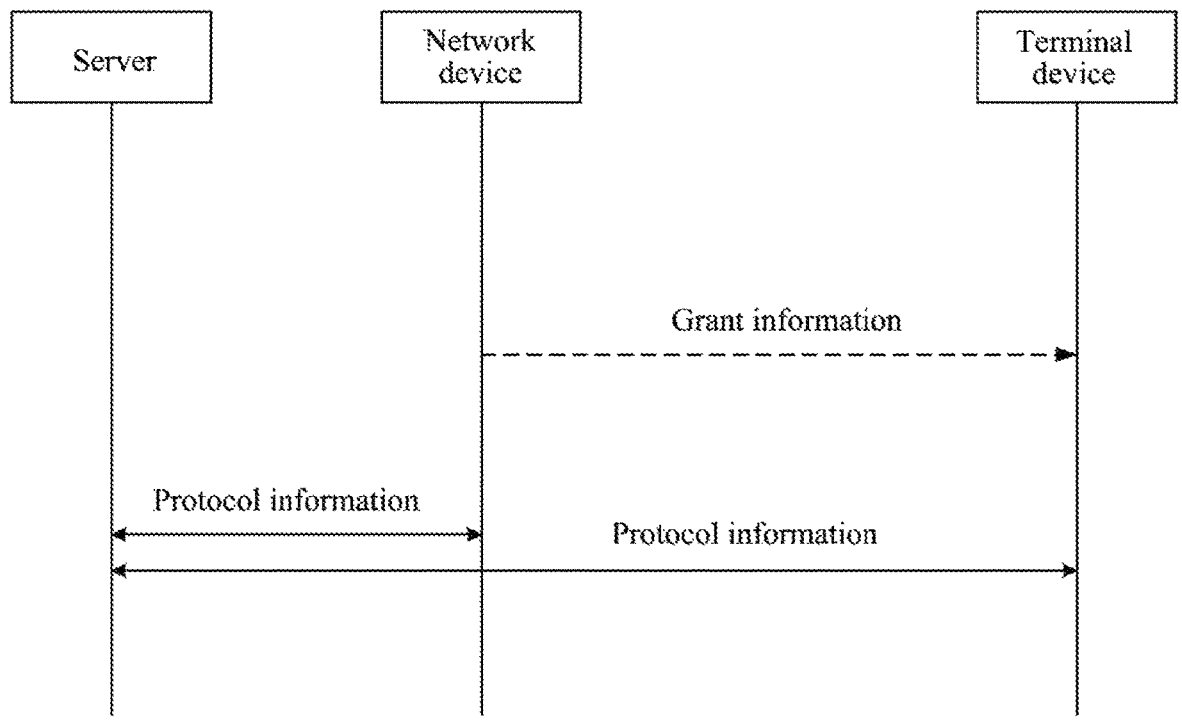
FIG. 7 is a schematic diagram of a terminal device acquiring a carrier or a carrier set for transmitting a service according to an implementation of the present disclosure.
FIG. 8 is a schematic flowchart of another wireless communication method according to an implementation of the present disclosure.

Optionally, the carrier set used by the terminal device to transmit the service may be configured by the network device or may be preconfigured by a protocol. For example, as shown in FIG. 7, a network device may configure a carrier or a carrier set for transmitting a service to a terminal device through grant information. For another example, as shown in FIG. 7, a server determines a carrier or a carrier set for the terminal device to transmit a service through a protocol. At this case, both the terminal device and the network device may learn protocol information from the server.

In 220, the terminal device sends or receives the service to be transmitted on the carrier or the carrier set corresponding to the service identification of the service to be transmitted.

Optionally, when performing logical channel prioritization (LCP) processing on the service to be transmitted in a Media Access Control (MAC) layer, the terminal device transmits the service to be transmitted on a transmission block of the carrier or the carrier set corresponding to the service identification of the service to be transmitted according to the corresponding relationship between the service identification of the service to be transmitted and the carrier or the carrier set.

Therefore, in the wireless communication method of the implementation of the present disclosure, the terminal device determines the carrier or carrier set for sending or receiving the service to be transmitted according to the service code point or service primitive of the service to be transmitted generated on the service layer, so that services generated on the service layer can correspond to different carriers or carrier sets, and the service to be transmitted can correspond to the carrier or carrier set at a smaller granularity for transmission, thus overcoming the problem that V2X services exceeding the quantity of PPPP values cannot be transmitted on different carriers or carrier sets due to the limited quantity of PPPP values, and further improving the service transmission rate.

FIG. 8 is a schematic flowchart of a wireless communication method 300 according to an implementation of the present disclosure. As shown in FIG. 8, the method 300 may be performed by a network device, and the network device may be the network device as shown in FIG. 1, and a terminal device in the method 300 may be the terminal device as shown in FIG. 1. The method 300 includes following contents.

In 310, a network device establishes a corresponding relationship between a service identification of a service to be transmitted and a carrier or a carrier set.

In 320, the network device sends first information to the terminal device, wherein the first information includes a corresponding relationship between the service identification of the service to be transmitted and the carrier or the carrier set.

Optionally, the service identification of the service to be transmitted is a service code point or a service primitive of the service to be transmitted that is generated on a service layer, the service code point is a code of the service generated by the service to be transmitted on the service layer, and the service primitive is a text description of the service generated by the service to be transmitted on the service layer.

Optionally, the service to be transmitted is a V2X service.

Optionally, the method 300 further includes:
the network device sends second information to the terminal device, and the second information indicates that a first carrier set is a carrier set for the terminal device to transmit a service.

Optionally, the second information is system information or RRC information.

Optionally, establishing, by the network device, the corresponding relationship between the service identification of the service to be transmitted and the carrier or the carrier set includes:
the network device classifies the service to be transmitted on the service layer and assigns different service identifications to different types of services, wherein the service identification is a service code point or a service primitive.

The network device establishes the corresponding relationship between the service identification of the service to be transmitted and the carrier or the carrier set.

Optionally, classifying, by the network device, the service to be transmitted on the service layer, includes:
the network device divides the service to be transmitted into a plurality of service types on the service layer, and a quantity of the plurality of service types is larger than a quantity of ProSe Per Packet Priority (PPPP) values.

Optionally, the corresponding relationship between the service identification of the service to be transmitted and the carrier or the carrier set includes:

a corresponding relationship between the service identification of the service to be transmitted and a data radio bearer (DRB), a corresponding relationship between the DRB and a logical channel, and a corresponding relationship between the logical channel and the carrier or the carrier set.

Optionally, the corresponding relationship between the service identification of the service to be transmitted and the carrier or the carrier set includes:
a corresponding relationship between the service identification of the service to be transmitted and a logical channel, and a corresponding relationship between the logical channel and the carrier or the carrier set.

Optionally, the corresponding relationship between the service identification of the service to be transmitted and the carrier or carrier set is integrated into a mapping table.

Optionally, the mapping table further includes:
information of duplicating or shunting a service to which the service identification of the service to be transmitted belongs.

It should be understood that the acts in the method 300 may be the corresponding acts described in the method 200, and will not be repeated here for the sake of brevity.

Therefore, in the wireless communication method of the implementations of the present disclosure, the network device establishes the corresponding relationship between the service identification of the service to be transmitted and the carrier or carrier set, and sends the corresponding relationship between the service identification of the service to be transmitted and the carrier or the carrier set to the terminal device, so that the terminal device performs service transmission on the carrier or the carrier set corresponding to the service to be transmitted, thus overcoming the problem that V2X services exceeding the quantity of PPPP values cannot correspond to different carriers or carrier sets for service transmission due to the limited quantity of the PPPP values, and further improving the service transmission rate.

Figure 9:
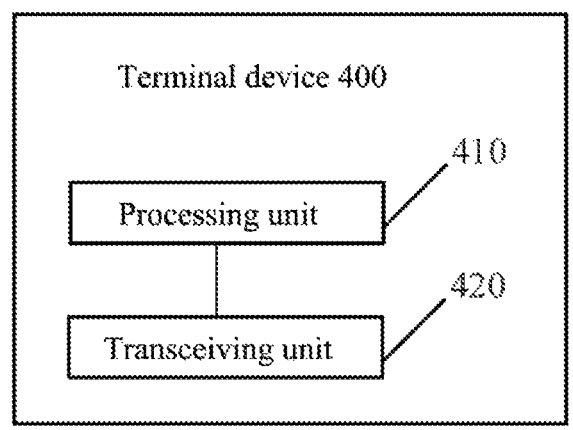
FIG. 9 is a schematic block diagram of a terminal device according to an implementation of the present disclosure.

FIG. 9 is a schematic block diagram of a terminal device 400 according to an implementation of the present disclosure. As shown in FIG. 9, the terminal device 400 includes a processing unit 410 and a transceiving unit 420.

The processing unit 410 is configured to determine a carrier or a carrier set for sending or receiving a service to be transmitted according to a service identification of the service to be transmitted.

The transceiving unit 420 is configured to send or receive the service to be transmitted on the carrier or the carrier set corresponding to the service identification of the service to be transmitted, wherein the service identification of the service to be transmitted is a service code point or a service primitive of the service to be transmitted that is generated on a service layer, the service code point is a code of the service generated by the service to be transmitted on the service layer, and the service primitive is a text description of the service generated by the service to be transmitted on the service layer.

Optionally, the processing unit 410 is specifically configured to: classify the service to be transmitted on the service layer, and assign different service identifications to different types of services; and determine the carrier or the carrier set for sending or receiving the service to be transmitted according to the service identification of the service to be transmitted.

Optionally, the processing unit 410 is specifically configured to: determine the carrier or the carrier set for sending or receiving the service to be transmitted according to the service identification of the service to be transmitted and a corresponding relationship between the service identification of the service to be transmitted and the carrier or the carrier set.

Optionally, before the processing unit 410 determines the carrier or carrier set for sending or receiving the service to be transmitted according to the service identification of the service to be transmitted and the corresponding relationship between the service identification of the service to be transmitted and the carrier or carrier set, the transceiving unit 420 is further configured to receive first information sent by a network device, wherein the first information includes the corresponding relationship between the service identification of the service to be transmitted and the carrier or the carrier set.

Optionally, before the processing unit 410 determines the carrier or carrier set for sending or receiving the service to be transmitted according to the service identification of the service to be transmitted and the corresponding relationship between the service identification of the service to be transmitted and the carrier or carrier set, the processing unit 410 is further configured to classify the service to be transmitted on the service layer and assign different service identifications to different types of services, wherein the service identification is a service code point or a service primitive.

The processing unit 410 is further configured to establish a corresponding relationship between the service identification of the service to be transmitted and the carrier or the carrier set.

Optionally, the processing unit 410 is further configured to divide the service to be transmitted into a plurality of service types on the service layer, and a quantity of the plurality of service types is larger than a quantity of ProSe Per Packet Priority (PPPP) values.

Optionally, the corresponding relationship between the service identification of the service to be transmitted and the carrier or the carrier set is preconfigured.

Optionally, the transceiver unit 420 is further configured to receive second information sent by the network device, wherein the second information indicates that a first carrier set is a carrier set for the terminal device to transmit a service.

The processing unit 410 is further configured to determine the carrier or carrier set for sending or receiving the service to be transmitted according to the first carrier set, the service identification of the service to be transmitted, and the corresponding relationship between the service identification of the service to be transmitted and the carrier or the carrier set.

Optionally, the second information is system information or radio resource control (RRC) information.

Optionally, the processing unit 410 is further configured to determine the carrier or carrier set for sending or receiving the service to be transmitted according to a second carrier set, the service identification of the service to be transmitted, and the corresponding relationship between the service identification of the service to be transmitted and the carrier or the carrier set, wherein the second carrier set is a preconfigured carrier set for the terminal device to transmit a service.

Optionally, the transceiver unit 420 is further configured to transmit the service to be transmitted on a transmission block of the carrier or the carrier set corresponding to the service identification of the service to be transmitted according to the corresponding relationship between the service identification of the service to be transmitted and the carrier or the carrier set when LCP processing is performed on the service to be transmitted in a medium access control (MAC) layer.

Optionally, the corresponding relationship between the service identification of the service to be transmitted and the carrier or the carrier set includes: a corresponding relationship between the service identification of the service to be transmitted and a data radio bearer (DRB), a corresponding relationship between the DRB and a logical channel, and a corresponding relationship between the logical channel and the carrier or the carrier set.

Optionally, the corresponding relationship between the service identification of the service to be transmitted and the carrier or the carrier set includes: a corresponding relationship between the service identification of the service to be transmitted and a logical channel, and a corresponding relationship between the logical channel and the carrier or the carrier set.

Optionally, the corresponding relationship between the service identification of the service to be transmitted and the carrier or carrier set is integrated into a mapping table.

Optionally, the mapping table further includes: information of duplicating or shunting a service to which the service identification of the service to be transmitted belongs.

Optionally, the service to be transmitted is a vehicle to everything (V2X) service.

It should be understood that the terminal device 400 according to the implementation of the present disclosure may correspond to the terminal device in the method implementation of the present disclosure, and the above and other operations and/or functions of various units in the terminal device 400 are respectively for realizing the corresponding processes of the terminal device in the method 200 shown in FIG. 3, and will not be repeated here for brevity.

Figure 10:
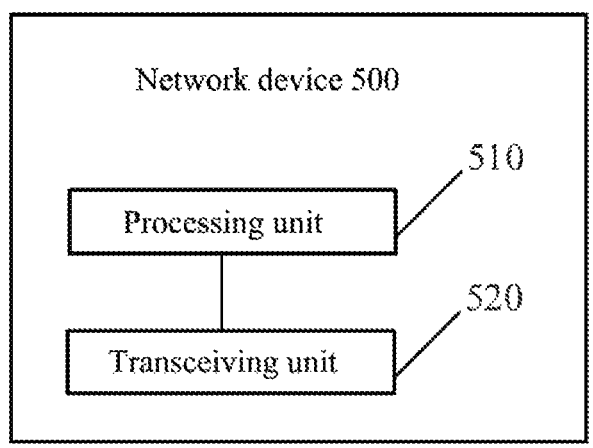
FIG. 10 is a schematic block diagram of a network device according to an implementation of the present disclosure.

FIG. 10 is a schematic block diagram of a network device 500 according to an implementation of the present disclosure. As shown in FIG. 10, the network device 500 includes a processing unit 510 and a transceiving unit 520.

The processing unit 510 is configured to establish a corresponding relationship between a service identification of a service to be transmitted and a carrier or a carrier set.

The transceiving unit 520 is configured to send first information to the terminal device, wherein the first information includes the corresponding relationship between the service identification of the service to be transmitted and the carrier or the carrier set.

The service identification of the service to be transmitted is a service code point or a service primitive of the service to be transmitted that is generated on a service layer, the service code point is a code of the service generated by the service to be transmitted on the service layer, and the service primitive is a text description of the service generated by the service to be transmitted on the service layer.

Optionally, the transceiving unit 520 is further configured to send second information to the terminal device, and the second information indicates that a first carrier set is a carrier set for the terminal device to transmit a service.

Optionally, the second information is system information or radio resource control (RRC) information.

Optionally, the processing unit 510 is further configured to classify the service to be transmitted on the service layer and assign different service identifications to different types of services, wherein the service identification is a service code points or a service primitive.

The processing unit 510 is further configured to establish a corresponding relationship between the service identification of the service to be transmitted and the carrier or the carrier set.

Optionally, the processing unit 510 is further configured to divide the service to be transmitted into a plurality of service types on the service layer, wherein a quantity of the plurality of service types is larger than a quantity of ProSe Per Packet Priority (PPPP) values.

Optionally, the corresponding relationship between the service identification of the service to be transmitted and the carrier or the carrier set includes: a corresponding relationship between the service identification of the service to be transmitted and a data radio bearer (DRB), a corresponding relationship between the DRB and a logical channel, and a corresponding relationship between the logical channel and the carrier or the carrier set.

Optionally, the corresponding relationship between the service identification of the service to be transmitted and the carrier or the carrier set includes: a corresponding relationship between the service identification of the service to be transmitted and a logical channel, and a corresponding relationship between the logical channel and the carrier or the carrier set.

Optionally, the corresponding relationship between the service identification of the service to be transmitted and the carrier or carrier set is integrated into a mapping table.

Optionally, the mapping table further includes: information of duplicating or shunting a service to which the service identification of the service to be transmitted belongs.

Optionally, the service to be transmitted is a vehicle to everything (V2X) service.

It should be understood that the network device 500 according to the implementation of the present disclosure may correspond to the network device in the method implementation of the present disclosure, and the above and other operations and/or functions of various units in the network device 500 are respectively for realizing the corresponding processes of the network device in the method 800 shown in FIG. 8, and will not be repeated here for brevity.

Figure 11:
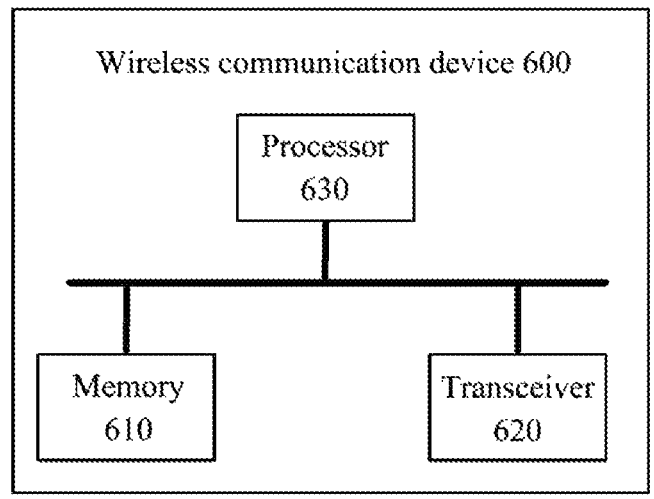
FIG. 11 is a schematic block diagram of a wireless communication device according to an implementation of the present disclosure.

FIG. 11 is a schematic block diagram of a wireless communication device according to an implementation of the present disclosure, and the device 600 includes: a memory 610 configured to store a program including codes; a transceiver 620 configured to communicate with other devices; and a processor 630 configured to execute the program codes in the memory 610.

Optionally, when the codes are executed, the processor 630 may implement various operations performed by the terminal device in the method 200 of FIG. 3, which will not be repeated here for brevity. At this case, the device 600 may be a terminal device (e.g., a cell phone). The transceiver 620 is configured to perform specific transmitting and receiving of signals under the driving of the processor 630.

Optionally, when the codes are executed, the processor 630 may implement various operations performed by the network device in the method 300 of FIG. 8, which will not be repeated here for brevity. At this case, the device 600 may be a network device (e.g., an access network device or a core network device).

It should be understood that in the implementation of the present disclosure, the processor 630 may be a Central Processing Unit (CPU), or the processor 630 may be other general purpose processors, digital signal processors (DSP), application specific integrated circuits (ASIC), Field programmable gate arrays (FPGA) or other programmable logic devices, discrete gate or transistor logic devices, discrete hardware components, etc. The general purpose processor may be a microprocessor or the processor may be any conventional processor or the like.

The memory 610 may include a read only memory and a random access memory, and provide instructions and data to the processor 630. A portion of memory 610 may include non-volatile random access memory. For example, the memory 610 may also store type information of a device.

The transceiver 620 may be configured to implement signal transmission and reception functions, such as frequency modulation and demodulation functions, or up-conversion and down-conversion functions.

In the implementation process, at least one act of the method may be completed by an integrated logic circuit of hardware in the processor 630, or the integrated logic circuit may complete the at least one act under the driving of instructions in a form of software. Therefore, the wireless communication device 600 may be a chip or a chipset. The acts of the method disclosed in connection with the implementation of the present disclosure may be directly embodied to be completed by an execution of a hardware processor or by a combination of hardware and software modules in a processor. The software modules may be located in a storage medium commonly used in the art, such as a random access memory, flash memory, read-only memory, programmable read-only memory or electrically erasable programmable memory, or register. The storage medium is located in the memory, and the processor 630 reads the information in the memory and accomplishes the acts of the method with its hardware. In order to avoid repetition, it will not be described in detail here.

Figure 12:
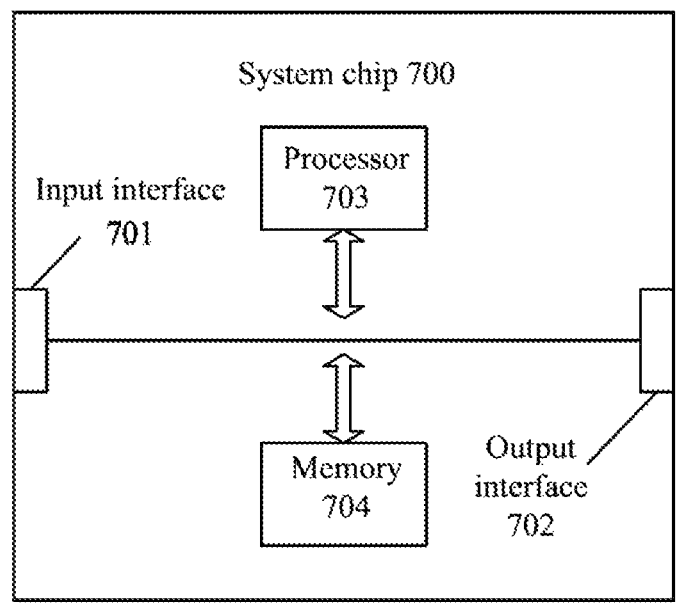
FIG. 12 is a schematic diagram of structure of a system chip according to an implementation of the present disclosure.

FIG. 12 is a schematic block diagram of a system chip 700 according to an implementation of the present disclosure. The system chip 700 of FIG. 12 includes an input interface 701, an output interface 702, a processor 703 and a memory 704, and the processor 703 and the memory 704 may be connected through internal communication connection lines, and the processor 1503 is configured to execute codes in the memory 1504.

Optionally, when the codes are executed, the processor 703 implements the method executed by the terminal device in the method implementation. For sake of conciseness, the specific description will not be repeated here.

Optionally, when the codes are executed, the processor 703 implements the method executed by the network device in the method implementation. For sake of conciseness, the specific description will not be repeated here.

Those of ordinary skill in the art will recognize that the exemplary units and algorithm acts described in connection with the implementations disclosed herein may be implemented in electronic hardware, or a combination of computer software and electronic hardware. Whether these functions are implemented in hardware or software depends on a specific application and design constraint of the technical solution. Skilled in the art may use different manners to realize the described functions for each particular application, but such realization should not be considered to be beyond the scope of the present disclosure.

Those skilled in the art may clearly understand that for convenience and conciseness of description, the specific working process of the system, device and unit described above may refer to the corresponding process in the aforementioned implementations of methods, and details are not described herein again.

In several implementations provided by the present disclosure, it should be understood that the disclosed system, device and method may be implemented in other ways. For example, the apparatus implementations described above are only illustrative, for another example, the division of the units is only a logical function division, and there may be other division manners in actual realization. For still another example, multiple units or components may be combined or integrated into another system, or some features may be ignored or not executed. On the other hand, the mutual coupling or direct coupling or communication connection shown or discussed may be indirect coupling or communication connection through some interfaces, devices or units, and may be in electrical, mechanical or other forms.

The units described as separated components may or may not be physically separated, and the component shown as a unit may or may not be a physical unit, i.e., it may be located in one place or may be allocated over multiple network units. Some or all of the units may be selected according to practical needs to achieve a purpose of the solution of the implementations.

In addition, various functional units in various implementations of the present disclosure may be integrated in one processing unit, or various units may be physically present separately, or two or more units may be integrated in one unit.

The functions may be stored in a computer readable storage medium if implemented in a form of a software functional unit and sold or used as a separate product. Based on this understanding, the technical solution of the present disclosure, in essence, or the part contributing to the existing art, or the part of the technical solution, may be embodied in the form of a software product stored in a storage medium, including several instructions for causing a computer device (which may be a personal computer, a server, or a network device, etc.) to perform all or part of the acts of the methods described in various implementations of the present disclosure. The aforementioned storage media include U disk, mobile hard disk, read-only memory (ROM), random access memory (RAM), magnetic disk or optical disk, and other media capable of storing program codes.

The foregoing are merely exemplary implementations of the present disclosure, but the protection scope of the present disclosure is not limited thereto. Any person skilled in the art may easily conceive variations or substitutions within the technical scope disclosed by the present disclosure, which should be included within the protection scope of the present disclosure. Therefore, the protection scope of the present disclosure should be subject to the protection scope of the claims.

What is claimed is:

1. A service transmission method, comprising:
    determining, by a terminal device, a carrier or a carrier set for sending or receiving a service to be transmitted according to a service identification of the service to be transmitted and a corresponding relationship between the service identification of the service to be transmitted and the carrier or the carrier set; and
    sending or receiving, by the terminal device, the service to be transmitted on the carrier or the carrier set corresponding to the service identification of the service to be transmitted, wherein the service identification of the service to be transmitted is a service code point or a service primitive of the service to be transmitted that is generated on a service layer, the service code point is a code of the service generated by the service to be transmitted on the service layer, and the service primitive is a text description of the service generated by the service to be transmitted on the service layer;
    wherein the corresponding relationship between the service identification of the service to be transmitted and the carrier or the carrier set comprises:
        a corresponding relationship between the service identification of the service to be transmitted and a data radio bearer (DRB), a corresponding relationship between the DRB and a logical channel, and a corresponding relationship between the logical channel and the carrier or the carrier set.

2. The method of claim 1, wherein determining, by the terminal device, the carrier or the carrier set for sending or receiving the service to be transmitted according to the service identification of the service to be transmitted, comprises:
    classifying, by the terminal device, the service to be transmitted on the service layer, and assigning different service identifications to different types of services; and
    determining, by the terminal device, the carrier or the carrier set for sending or receiving the service to be transmitted according to the service identification of the service to be transmitted.

3. The method of claim 1, wherein before the terminal device determines the carrier or the carrier set for sending or receiving the service to be transmitted according to the service identification of the service to be transmitted and the corresponding relationship between the service identification of the service to be transmitted and the carrier or the carrier set, the method further comprises:
    receiving, by the terminal device, first information sent by a network device, wherein the first information comprises the corresponding relationship between the service identification of the service to be transmitted and the carrier or the carrier set.

4. The method of claim 1, wherein before the terminal device determines the carrier or the carrier set for sending or receiving the service to be transmitted according to the service identification of the service to be transmitted and the corresponding relationship between the service identification of the service to be transmitted and the carrier or the carrier set, the method further comprises:
    classifying, by the terminal device, the service to be transmitted on the service layer, and assigning different service identifications to different types of services; and
    establishing, by the terminal device, the corresponding relationship between the service identification of the service to be transmitted and the carrier or the carrier set.

5. The method of claim 4, wherein classifying, by the terminal device, the service to be transmitted on the service layer, comprises:
    dividing, by the terminal device, the service to be transmitted into a plurality of service types on the service layer, wherein a quantity of the plurality of service types is larger than a quantity of ProSe Per Packet Priority (PPPP) values.

6. The method of claim 1, wherein the corresponding relationship between the service identification of the service to be transmitted and the carrier or the carrier set is preconfigured.

7. The method of claim 1, wherein determining, by the terminal device, the carrier or the carrier set for sending or receiving the service to be transmitted according to the service identification of the service to be transmitted and the corresponding relationship between the service identification of the service to be transmitted and the carrier or the carrier set, comprises:

receiving, by the terminal device, second information sent by the network device, wherein the second information indicates that a first carrier set is a carrier set for the terminal device to transmit a service; and determining, by the terminal device, the carrier or the carrier set for sending or receiving the service to be transmitted according to the first carrier set, the service identification of the service to be transmitted, and the corresponding relationship between the service identification of the service to be transmitted and the carrier or the carrier set.

8. The method of claim 7, wherein the second information is system information or radio resource control (RRC) information.

9. The method of claim 1, wherein determining, by the terminal device, the carrier or the carrier set for sending or receiving the service to be transmitted according to the service identification of the service to be transmitted and the corresponding relationship between the service identification of the service to be transmitted and the carrier or the carrier set, comprises:

determining, by the terminal device, the carrier or the carrier set for sending or receiving the service to be transmitted according to a second carrier set, the service identification of the service to be transmitted and the corresponding relationship between the service identification of the service to be transmitted and the carrier or the carrier set, wherein the second carrier set is a preconfigured carrier set for the terminal device to transmit a service.

10. The method of claim 1, wherein the corresponding relationship between the service identification of the service to be transmitted and the carrier or the carrier set is integrated in a mapping table.

11. The method of claim 10, wherein the mapping table further comprises: information of duplicating or shunting a service to which the service identification of the service to be transmitted belongs.

12. The method of claim 1, wherein the service to be transmitted is a vehicle to everything (V2X) service.

13. A terminal device, comprising: a processor, a memory, and a communication interface, wherein the processor is connected with the memory and the communication interface, the memory is configured to store instructions, the communication interface is configured to communicate with other network elements under the control of the processor, and the processor is configured to execute the instructions, and when the processor executes the instructions stored in the memory, the processor is configured to:

determine a carrier or a carrier set for sending or receiving a service to be transmitted according to a service identification of the service to be transmitted and a corresponding relationship between the service identification of the service to be transmitted and the carrier or the carrier set; and control the communication interface to send or receive the service to be transmitted on the carrier or the carrier set corresponding to the service identification of the service to be transmitted, wherein the service identification of the service to be transmitted is a service code point or a service primitive of the service to be transmitted that is generated on a service layer, the service code point is a code of the service generated by the service to be transmitted on the service layer, and the service primitive is a text description of the service generated by the service to be transmitted on the service layer, wherein the corresponding relationship between the service identification of the service to be transmitted and the carrier or the carrier set comprises:

a corresponding relationship between the service identification of the service to be transmitted and a data radio bearer (DRB), a corresponding relationship between the DRB and a logical channel, and a corresponding relationship between the logical channel and the carrier or the carrier set.

14. The terminal device of claim 13, wherein the processor is further configured to:

classify the service to be transmitted on the service layer, and assign different service identifications to different types of services; and determine the carrier or the carrier set for sending or receiving the service to be transmitted according to the service identification of the service to be transmitted.

15. A network device, comprising: a processor, a memory, and a communication interface, wherein the processor is connected with the memory and the communication interface, the memory is configured to store instructions, the communication interface is configured to communicate with other network elements under the control of the processor, and the processor is configured to execute the instructions, and when the processor executes the instructions stored in the memory, the processor is configured to:

establish a corresponding relationship between a service identification of a service to be transmitted and a carrier or a carrier set; and control the communication interface to send first information to a terminal device, wherein the first information comprises the corresponding relationship between the service identification of the service to be transmitted and the carrier or the carrier set, wherein the service identification of the service to be transmitted is a service code point or a service primitive of the service to be transmitted that is generated on a service layer, the service code point is a code of the service generated by the service to be transmitted on the service layer, and the service primitive is a text description of the service generated by the service to be transmitted on the service layer, wherein the corresponding relationship between the service identification of the service to be transmitted and the carrier or the carrier set comprises:

a corresponding relationship between the service identification of the service to be transmitted and a data radio bearer (DRB), a corresponding relationship between the DRB and a logical channel, and a corresponding relationship between the logical channel and the carrier or the carrier set.

* * * * *